United States Patent [19]
Carroll et al.

[11] Patent Number: 5,347,263
[45] Date of Patent: Sep. 13, 1994

[54] ELECTRONIC IDENTIFIER APPARATUS AND METHOD UTILIZING A SINGLE CHIP MICROCONTROLLER AND AN ANTENNA COIL

[75] Inventors: Gary T. Carroll, Boulder; J. Donald Pauley, Estes Park, both of Colo.

[73] Assignee: Gnuco Technology Corporation, Boulder, Colo.

[21] Appl. No.: 14,458

[22] Filed: Feb. 5, 1993

[51] Int. Cl.$^5$ ............................................. G08B 13/14
[52] U.S. Cl. ............................... 340/572; 340/825.31; 340/825.54; 340/825.34; 342/44; 235/382
[58] Field of Search .................. 340/825.54, 825.31, 340/825.34, 572, 539; 235/449, 382; 342/42, 44

[56] References Cited

U.S. PATENT DOCUMENTS

| | | | |
|---|---|---|---|
| 3,859,624 | 1/1975 | Kriofsky et al. | 340/152 |
| 3,878,528 | 4/1975 | Majeau | 343/6.5 SS |
| 4,095,214 | 6/1978 | Minasy | 340/258 |
| 4,129,855 | 12/1978 | Rodrian | 340/152 |
| 4,354,099 | 10/1982 | Rayment et al. | 235/449 |
| 4,475,481 | 10/1984 | Carroll | 119/51 R |
| 4,549,264 | 10/1985 | Carroll et al. | 364/406 |
| 4,672,375 | 6/1987 | Mochida et al. | 340/825.31 |
| 4,688,036 | 8/1987 | Hirano et al. | 340/825.31 |
| 4,724,427 | 2/1988 | Carroll | 342/44 |
| 4,739,328 | 4/1988 | Koelle et al. | 342/44 |
| 4,857,893 | 8/1989 | Carroll | 340/572 |
| 4,893,118 | 1/1990 | Lewiner et al. | 340/825.34 |
| 5,023,887 | 6/1991 | Takeuchi et al. | 340/825.54 |
| 5,070,500 | 12/1991 | Horinouchi et al. | 340/825.54 |
| 5,235,326 | 8/1993 | Beigel et al. | 340/572 |
| 5,266,926 | 11/1993 | Beigel | 340/825.54 |

*Primary Examiner*—James J. Groody
*Assistant Examiner*—John W. Miller
*Attorney, Agent, or Firm*—Fitch, Even, Tabin & Flannery

[57] ABSTRACT

Low cost, compact electronic identifier apparatus interrogates a passive (no external power) or active (external power) transponder. Such identifier apparatus and transponder(s) may be used, e.g., for: (1) access control, (2) animal feeding and animal health, (3) inventory control, (4) process control, and/or (5) theft/security applications. The identifier apparatus further powers the transponder if it is passive. A power carrier signal broadcast by the identifier apparatus clocks and/or synchronizes the transponder operation. In response to being interrogated, the transponder sends back identification (ID) data. The ID data is received and extracted by the identifier apparatus in the presence of the power carrier "noise", and is then demodulated and decoded to recover the ID data. The electronic identifier apparatus uses a low cost, high speed, single chip microcontroller configured to operate so as to eliminate the use of decoders, drivers and other external circuitry.

17 Claims, 10 Drawing Sheets

ELECTRONIC IDENTIFIER APPARATUS AND METHOD UTILIZING A SINGLE CHIP MICROCONTROLLER AND AN ANTENNA COIL

BACKGROUND OF THE INVENTION

The present invention relates to electronic identification devices, and in particular to an inexpensive, high speed, identifier apparatus that when placed near a passive or active transponder is able to receive and decode an ID signal transmitted by the transponder, as well as provide operating power to the transponder, if it is a passive transponder.

Identification (ID) devices and systems are known in the art. See, e.g., U.S. Pat. Nos. 3,859,624; 3,878,528; 4,095,214; 4,129,855; 4,354,099; 4,475,481; 4,549,264; and 4,739,328. Typically, such devices and systems are used for (1) access control, (2) animal feeding and animal health, (3) inventory control, (4) process control, and/or (5) theft/security applications.

A representative identification system includes: (1) a transponder that transmits a unique identification (ID) signal; and (2) a receiver, or "reader" that receives and decodes ("reads") the ID signal. The transponders are typically small, inexpensive, devices that perform the dedicated function of generating and transmitting their unique ID signal in response to being interrogated by a "reader". The transponders are placed on, or carried by, objects, animals, or persons that are to be identified. The "readers" are placed near a location where an identification is to be made. Hence, when an object, animal, or person carrying a transponder comes near a "reader", the reader is able to trigger the generation of the ID signal, receive the ID signal, and decode the ID signal so as to identify the particular object, animal, or person to whom the transponder has been attached. In response to making such a valid identification, the "reader" may then generate appropriate control signals that carry out a desired function, e.g., the unlocking of a door, the dispensing of a prescribed amount of food, the turning on of a video camera or audio recorder, the time logging of the ID signal, the enabling of a piece of machinery, and the like.

Some identification systems may utilize a transmitter to generate the ID signal, as opposed to a transponder. In such instances, the transmitter periodically generates and transmits the ID signal, e.g., once every 10 seconds, regardless of whether the transmitter is near a "reader". However, the ID signal is of limited range, so the ID signal is only received by the "reader" when the transmitter is in close proximity thereto.

The present invention relates primarily to the "reader" device, hereafter also referred to as an "identifier" device or apparatus. Equipment presently used to perform the function of the identifier apparatus in an electronic identification system is generally one of two types. A first type is a "portable" identifier used to read transponders on animals, packages, or people. Such portable identifier typically is about the size of a clothing iron, and may weigh several pounds. Some older portable readers or identifiers are much larger, and are so bulky that they must be placed on a strap and hung over the shoulder of a user. But even when only the size of a clothing iron, the carrying and positioning of such identifier apparatus can become tiring and burdensome. Thus, there is a need in the art for a smaller, more compact, and light weight identifier device.

The second type of identifier device used in the art is a "stationary" identifier, typically permanently housed in a box mounted on a wall or door, and used to read a transponder-type security badge. In most cases, in order to keep the size of the box small and unobtrusive, an antenna and a minimum amount of circuitry is housed in the box, while the remaining circuitry is housed in another (usually hidden) box mounted in the ceiling or elsewhere. The separating of the circuitry between two or more boxes in this manner results in increased expense, maintenance and circuit complexity. What is thus needed is an identifier device that can perform all the identifying functions needed by the security system using inexpensive circuitry that may be housed in a single, small, unobtrusive housing.

SUMMARY OF THE INVENTION

The present invention advantageously addresses the above and other needs by providing an electronic identifier device that utilizes a very simple, high speed, low cost microprocessor to perform the functions that normally require numerous components and circuits.

In accordance with one aspect of the invention, electronic identifier apparatus is provided that interrogates a passive (no external power) or active (external powered) transponder. The identifier apparatus not only interrogates the transponder for its ID signal, but also powers it if the transponder is passive. Interrogation is achieved by generating a power carrier signal that is appropriately modulated so as to not only provide operating power to the transponder, if needed (i.e., for a passive transponder), but also to synchronize the operation of the transponder. In response to being interrogated, the transponder generates and transmits a unique identification (ID) data signal. The ID data signal is received and decoded by the identifier apparatus in the presence of the power carrier "noise".

In accordance with another aspect of the invention, a radically simplified electronic identifier design is provided that uses a low cost, high speed, microprocessor configured to operate so as to eliminate the need for expensive decoders, drivers and other external circuitry, that have heretofore been necessary in electronic identifier devices. As a result, most of the integrated circuits and passive components, such as resistors, capacitors, diodes, crystals, logic gates, etc., that have heretofore been used in electronic identifiers are not needed by the identifier of the present invention. For example, whereas a prior art identifier device may include a dozen integrated circuits or more and over a hundred passive components, one embodiment of an identifier device of the present invention achieves the same functions as the prior art device using only a couple of low-priced integrated circuits and three dozen passive components. Thus, the present invention not only provides an identifier device at a much lower cost than has heretofore been achievable, but also provides an identifier device having an increased reliability due to a significant decrease in the number of parts.

The identifier apparatus of the invention may be used, e.g., in identification systems adapted for: (1) access control, (2) animal feeding and animal health, (3) inventory control, (4) process control, (5) theft/security applications, and/or any other application requiring a fast, reliable, low cost identifier device. Advantageously, another aspect of the invention provides a basic, low-cost identifier device that can be easily configured to operate in whatever environment or for whatever application is needed.

The present invention may thus be characterized as electronic identifier apparatus. Such apparatus includes: (1) an antenna coil; (2) a single chip microcontroller connected directly to the antenna coil; (3) a peak detection circuit connected to the antenna coil; (4) a band pass amplifier connected to the demodulator circuit; and (4) an interface circuit connected to the single chip microcontroller. The single chip microcontroller includes a memory circuit wherein a control program is stored, and a multiplicity of I/O pins through which data or control signals may be transferred into and out of the single chip microcontroller. Each I/O pin is connected to a respective I/O circuit included within the single chip microcontroller, and a plurality of the I/O pins are connected in parallel and connected directly to the antenna coil without using any driver circuits. The band pass amplifier is configured to pass an ID carrier signal received through the antenna coil and peak detector circuit, and applies any such ID carrier signal to the single chip microcontroller. The single chip microcontroller, in turn, is configured by the control program to (a) generate a power output signal that is applied to the antenna coil through the plurality of parallel-connected I/O pins, (b) decode any ID carrier signal that is received through the band pass amplifier, and (c) produce at least one control signal responsive to the receipt, demodulation and decoding of a particular ID carrier signal.

An electronic identifier apparatus as thus described may advantageously be used to identify a particular ID carrier signal generated by a particular transponder unit. The transponder unit will typically be a small passive device that generates its unique ID carrier signal only when the identifier apparatus is brought in close proximity thereto, thereby allowing the output power signal generated by the identifier to be received by the transponder. Once the transponder unit has been powered, it begins generating its particular ID carrier signal. Such ID carrier signal is received at the antenna coil of the identifier and is extracted from the power signal also present at the antenna coil. Then, it is demodulated, as necessary, and decoded to determine the particular ID carrier signal, and hence the particular transponder unit, that is in close proximity to the identifier apparatus.

One application for the identifier apparatus, for example, is an auto security system. The identifier apparatus is mounted in a hidden location in an automobile. The owner of the automobile carries a passive transponder on his key chain, or otherwise on his person. When the owner gets in the automobile to drive it, he must first place the transponder unit next to the identifier apparatus so that the identifier apparatus can "read" the transponder to make sure it belongs to the owner. If so, a couple of audible "beeps" are generated, and a control signal enables the ignition system of the automobile, thereby allowing the owner to start the auto's engine.

The invention may also be characterized as an electronic identifier apparatus, substantially as described above, that constitutes only an antenna coil; a single chip microcontroller connected directly to the antenna coil; a peak detector circuit connected to the antenna coil; a multi-stage band pass amplifier connected to the peak detector circuit; and an interface circuit, with such elements cooperating with each other substantially as described above. Advantageously, such identifier apparatus may thus be realized using very few parts, i.e., only two off-the-shelf integrated circuits and about 36 discrete components, and can thus be made relatively inexpensively and compactly.

Further, the invention may be characterized as a method of electronically identifying a particular transponder unit. The particular transponder unit to be identified has circuitry that transmits an assigned identification signal upon being powered from an external source. The method includes the steps of: (a) generating a square-wave carrier signal of a prescribed carrier frequency with a single chip microcontroller and outputting such carrier signal to a multiplicity of I/O pins of the single chip microcontroller; (b) directly connecting a multiplicity of the I/O pins in parallel to an antenna coil having an inductance, whereby the square-wave carrier signal is applied directly to the antenna coil from the I/O pins of the single chip microcontroller, and a current flows through the antenna coil that, because of the inductance, is more or less sinusoidal; (c) positioning the antenna coil within about 2 to 10 cm of the transponder unit so that power is induced in the transponder unit from the carrier signal, whereby the transponder unit transmits its assigned identification signal; (d) sensing and demodulating any identification signals that may be transmitted by the transponder unit while the antenna coil is within about 2 to 10 cm of the transponder unit; and (e) verifying if the identification signal sensed and demodulated in step (d) is the identification signal assigned to a particular transponder unit, and if so generating a control signal that indicates the particular transponder unit has been identified.

It is thus a feature of the invention to provide a small, identifier device that utilizes a low number of off-the-shelf components.

It is another feature of the invention to provide such an identifier device using off-the-shelf circuitry that may be housed in a single, small, unobtrusive housing, and that can perform all of the identifying functions required of an identifier device of a typical identification system.

It is a further feature of the invention to provide a small, compact identifier device that is easily adaptable or customized for use in a wide variety of applications.

It is still another feature of the invention to provide an identifier device that uses low cost components and is inexpensive to manufacture.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
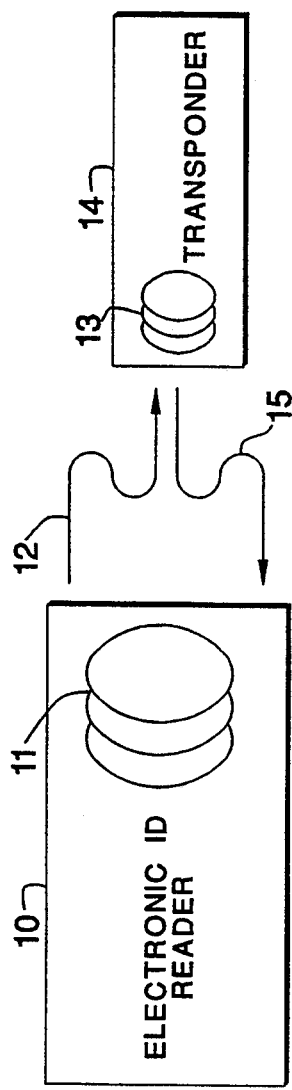
FIG. 1 is a block diagram of a prior identification system, and illustrates the interaction between a reader unit (identifier device) and transponder unit.

An electronic ID system is shown generally in FIG. 1. Such system includes a transponder 14 and a reader 10. (Note, the terms "reader" and "identifier" are used interchangeably herein.) The transponder 14 is normally a custom integrated circuit combined with a coil 13. The transponder integrated circuit is designed to perform the functions of rectification, voltage regulation, clocking, addressing, memory, and the logical interconnection of such functions. A representative transponder unit is described, e.g., in U.S. Pat. Nos. 4,724,427 or 4,857,893, both of which are incorporated herein by reference.

A transponder unit operates by receiving electromagnetic energy, represented in FIG. 1 by the wavy arrow 12, from an antenna coil 11 of the reader 10. This energy is picked up by the coil 13 connected to the custom integrated circuit of the transponder 14. The coil 13 acts like a secondary winding of a transformer, with the coil 11 acting like the primary winding of the transformer. Thus, energy is coupled from the coil 11 to the coil 13 when such coils are in close proximity to each other. This coupled energy is rectified in the integrated circuit of the transponder 14 and regulated by an internal regulator.

Advantageously, the power signal 12 coupled through the coils 11 and 13 may also be modulated to provide a clock signal to the transponder integrated circuit. The transponder also includes a memory circuit, typically a read-only memory (ROM) circuit, wherein unique identification data is stored. The circuits of the transponder 14 take the clock signal obtained from the power signal 12 and produce additional synchronized clock and other signals for operation of the transponder logic circuits. In addition, the logic circuits typically divide down the incoming frequency of the power signal to produce a return carrier frequency that becomes an ID carrier signal, represented in FIG. 1 by the wavy arrow 15, that is sent back to the reader 10. The ID carrier signal includes, i.e., is modulated with, identification data that is uniquely assigned to the particular transponder integrated circuit from which it originates. The identification data is obtained within the transponder unit 14 by using the clock, included in or derived from the power signal 12, to step through the memory addresses of the ROM circuit and send back to the reader 10 some or all of the data stored in memory, thus providing the reader 10 with identification data unique to the particular transponder 14.

The reader 10 produces the electromagnetic energy 12 by driving current into the antenna coil 11. Heretofore, a large drive circuit has been required to perform this function. Advantageously, as explained more fully below, the present invention eliminates the need for any such drive circuits by connecting multiple I/O pins of a microcontroller chip used within the reader 10 in parallel and driving the coil directly from the microcontroller. By driving the coil, which is an inductive load, directly from the microcontroller (which the I/O circuits of the microcontroller are not designed to do), the output currents from the I/O pins are limited to a certain degree, producing a "softness" that inherently performs a filtering function. As a result, because the I/O circuits are not able to drive the coil 11 hard enough to produce large amounts of harmonics (dv/dt), the actual electrical current that flows in the coil 11 as a result of the power signal is more or less sinusoidal.

Before describing the preferred reader 10 of the present invention in more detail, it will be helpful to review the functions, and associated circuitry, that are typically performed in a reader device. Hence, reference is next made to FIG. 2 where there is shown a functional block diagram of a prior art reader unit 20. Such unit 20 may be realized using many subassemblies, each performing a specific function needed during the electronic reading process. An internal oscillator 22, for example, uses a crystal 21 to generate an exact frequency from which the power signal may be generated. Normally the power frequency is a fairly low value so a divider circuit 23 is installed between the oscillator and the driver circuit 24. In theory, a low frequency crystal could be used to create this carrier signal, but the cost and size of such a low frequency crystal makes it somewhat impractical. Hence, most designers will use a smaller and lower cost crystal that generates a higher oscillator frequency, and then divide the high frequency down using the divider circuit 23 in order to obtain the desired carrier frequency.

Figure 2:
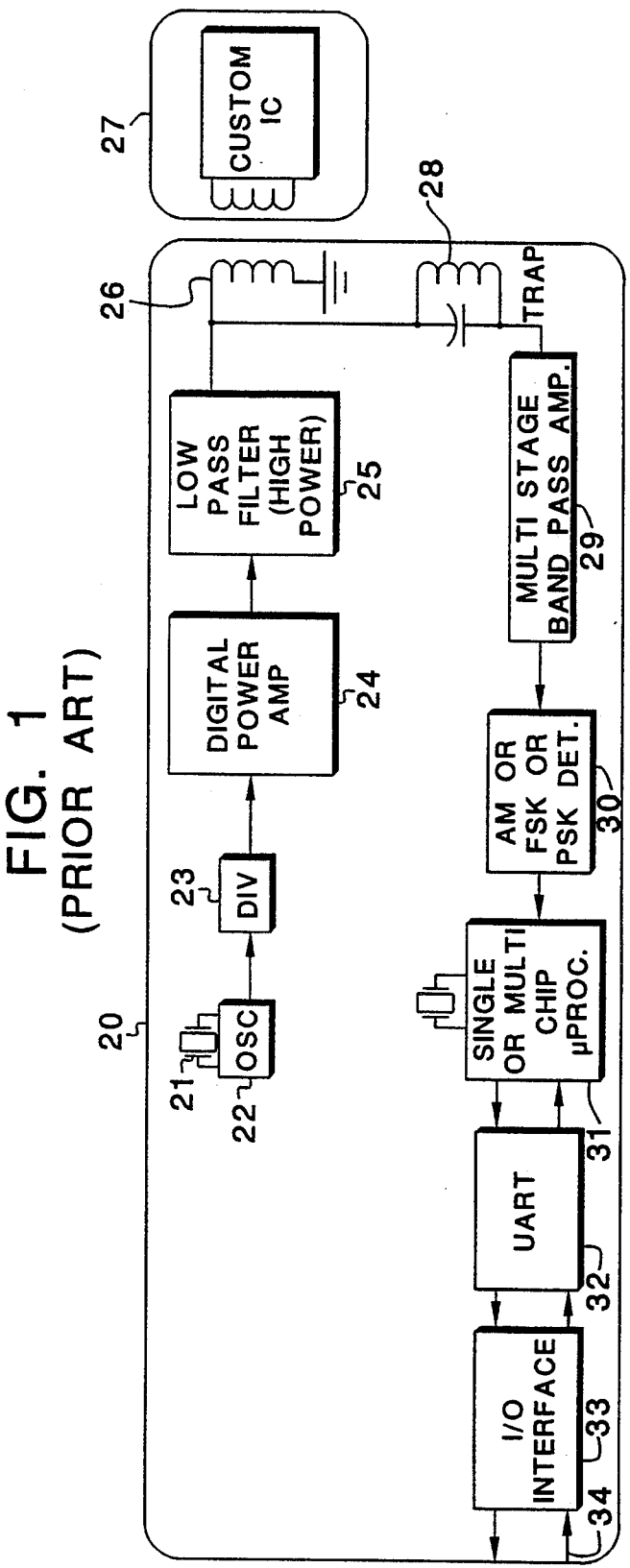
FIG. 2 is a functional block diagram of a prior art reader unit.

Still referring to FIG. 2, the output of the divider circuit 23 excites a power driver circuit 24. The power driver circuit 24 creates a relatively high power signal that must then be filtered, using filter circuit 25 (which must be capable of handling a high power input signal) to take out the higher order harmonics. The filtered signal is then applied to the antenna coil 26, which antenna radiates an electromagnetic field for a few inches therefrom. Such electromagnetic field interacts with a coil of a transponder 27 when the transponder is within a few inches of the coil 26.

The transponder 27 receives power from the power signal and sends back a portion of the incoming energy at a different frequency from the power carrier, as described above. Such signal from the transponder may be generally viewed as "reflected energy," at least with respect to a passive transponder. Such reflected energy is picked up by the antenna 26 of the reader 20. In order for the reader 20 to recognize this reflected energy as a new signal, it must filter out the power carrier signal and pass the received signal to an amplifier. This is done by a resonant filter 28 that blocks most of the power carrier frequency and amplifies the received signal. The received signal is then further amplified and filtered by a multi-stage band pass amplifier 29. Such multi-stage band pass amplifier 29 filters out most of the remaining power carrier and further amplifies the received signal.

The output signal from the band pass amplifier 29 is presented to a detector 30. The detector 30 takes the received signal and converts it from a raw carrier signal to a digital bit stream, i.e., it demodulates the raw carrier signal. The digital bit stream is then passed to a microprocessor 31, where the data contained therein, e.g., the identification data of the transponder, can be appropriately processed.

The type of identification signal coming from the transponder 27 may be modulated in various ways, e.g., AM (amplitude modulation), FSK (frequency shift keyed) modulation or PSK (phase shift keyed) modulation. Advantageously, the type of modulation used by the transponder makes little difference to the identifier of the present invention.

The output signal from the detector 30 feeds the detected data to the microprocessor 31. The microprocessor 31 processes this data in an appropriate manner, as controlled by a control or operating program made available to the microprocessor. Such processing typically includes converting the data to a serial bit stream of characters that are sent to peripheral equipment, where some appropriate action is taken. For example, such action may include, but is not limited to: opening a door, turning on a feeder, triggering an alarm, or enabling a piece of machinery.

Further shown in FIG. 2 is a UART (universal synchronous receiver-transmitter) 32. The UART 32 facilitates the transfer of data from the reader 20. In some instances, the UART 32 may be omitted if the data is sent back as a Weigand signal or some other standard interface signal. Some microprocessors may have the UART function built into their hardware. Such built-in capability is convenient, but it adds to the complexity and cost of the microprocessor. The UART 32 converts a parallel output, obtained, e.g., from the microprocessor 31 into a serial bit stream suitable for transfer to a peripheral device. The UART 32 further inserts appropriate start and stop bits, and is timed exactly to fit standard protocol timing, such as 9600 baud, 2400 baud, 1200 baud etc. The output data stream from the UART 32 is converted by an I/O interface circuit 33 to a level and format that is compatible with some standard I/O protocols, such as RS-232, RS-485 etc. A desired protocol is represented in FIG. 2 by the reference numeral 34.

Figure 3:
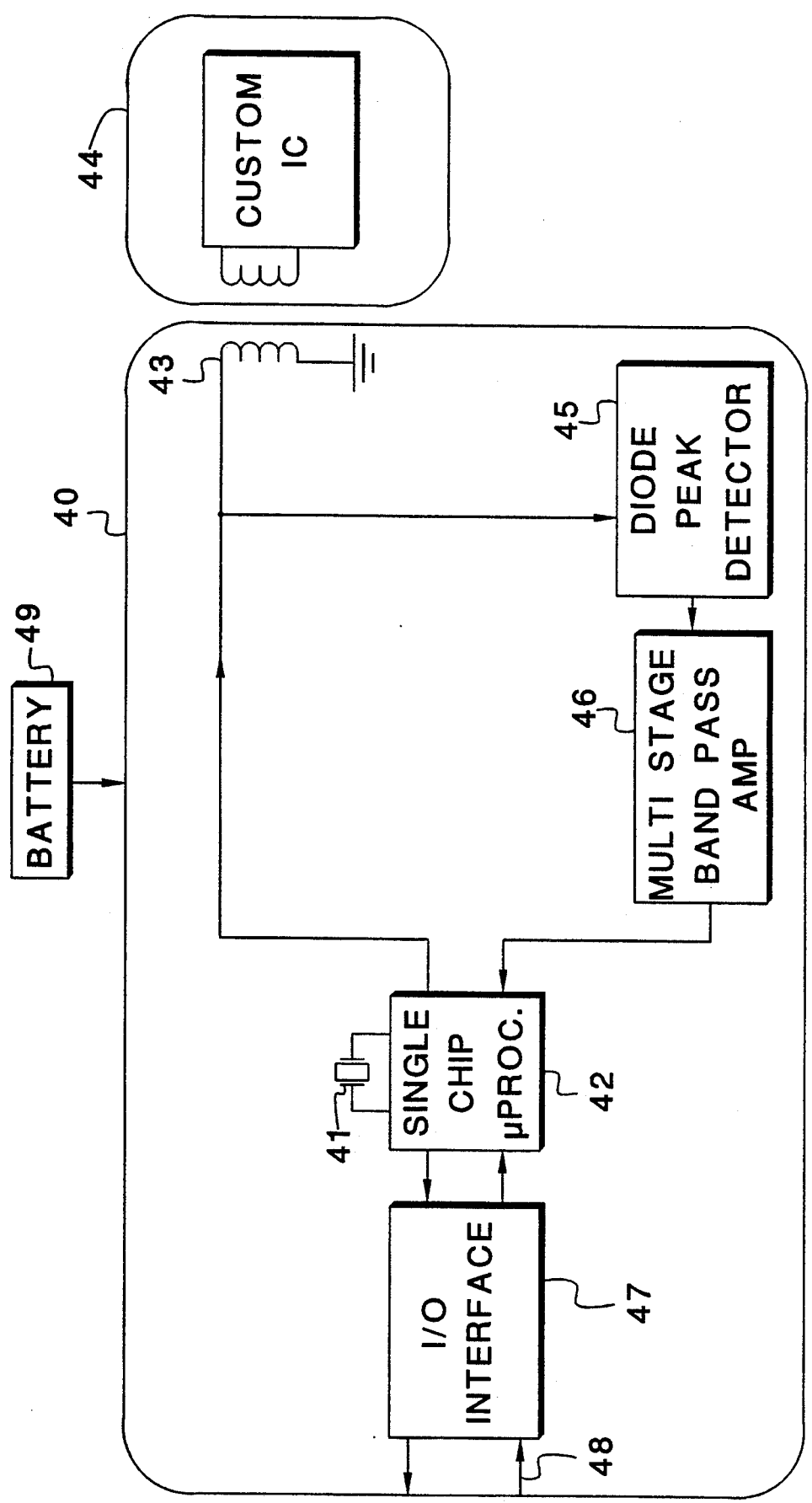
FIG. 3 is a block diagram of an identification device made in accordance with the present invention.

Advantageously, a preferred embodiment of the present invention provides the same "reader" functions of the prior art reader 20 shown in the functional block diagram of FIG. 2, but at a significant savings in terms of expense, circuit complexity, and number of components than have heretofore been required to achieve such functions. A block diagram of the preferred embodiment of the present invention is shown in FIG. 3 as an identifier device 40. Advantageously, the identifier device 40 performs all of the functions of the reader 20, but it does so in a unique way. As a result, the identifier 40 uses a considerable less amount of the hardware than has heretofore been required.

As seen in FIG. 3, the identifier 40 includes just a single chip microprocessor 42, an antenna coil 43, a diode peak detector 45 (used as an "extractor" to extract the signal returned from the transponder from the power signal), a multi-stage band pass amplifier 46, and an I/O interface. It is also assumed, that a suitable source of operating power, such as a battery 49, is either provided as part of the identifier 40, or is external thereto and coupled into the identifier 40 through an appropriate power connection. The microprocessor 42 has its own crystal 41 (or low cost ceramic resonator) to drive its internal operations. This crystal 41 is the only time base in the identifier unit 40. The microprocessor 42, in the preferred embodiment, is realized using a commercially available EPROM-based 8-Bit CMOS Microcontroller, such as the PIC16C5x series available from Microchip Technology, Inc. Such device is of the RISC (Reduced Instruction Set Computer) variety, which means it uses fewer instructions and each instruction is very fast. Advantageously, the RISC-like language used with the PIC16C5x series of devices includes only 33 single word instructions. Almost all of these instructions, except for program branches (which are two-cycle operations), take only a single cycle, thereby making the PIC16C5x processor very fast and very efficient.

Figure 4:
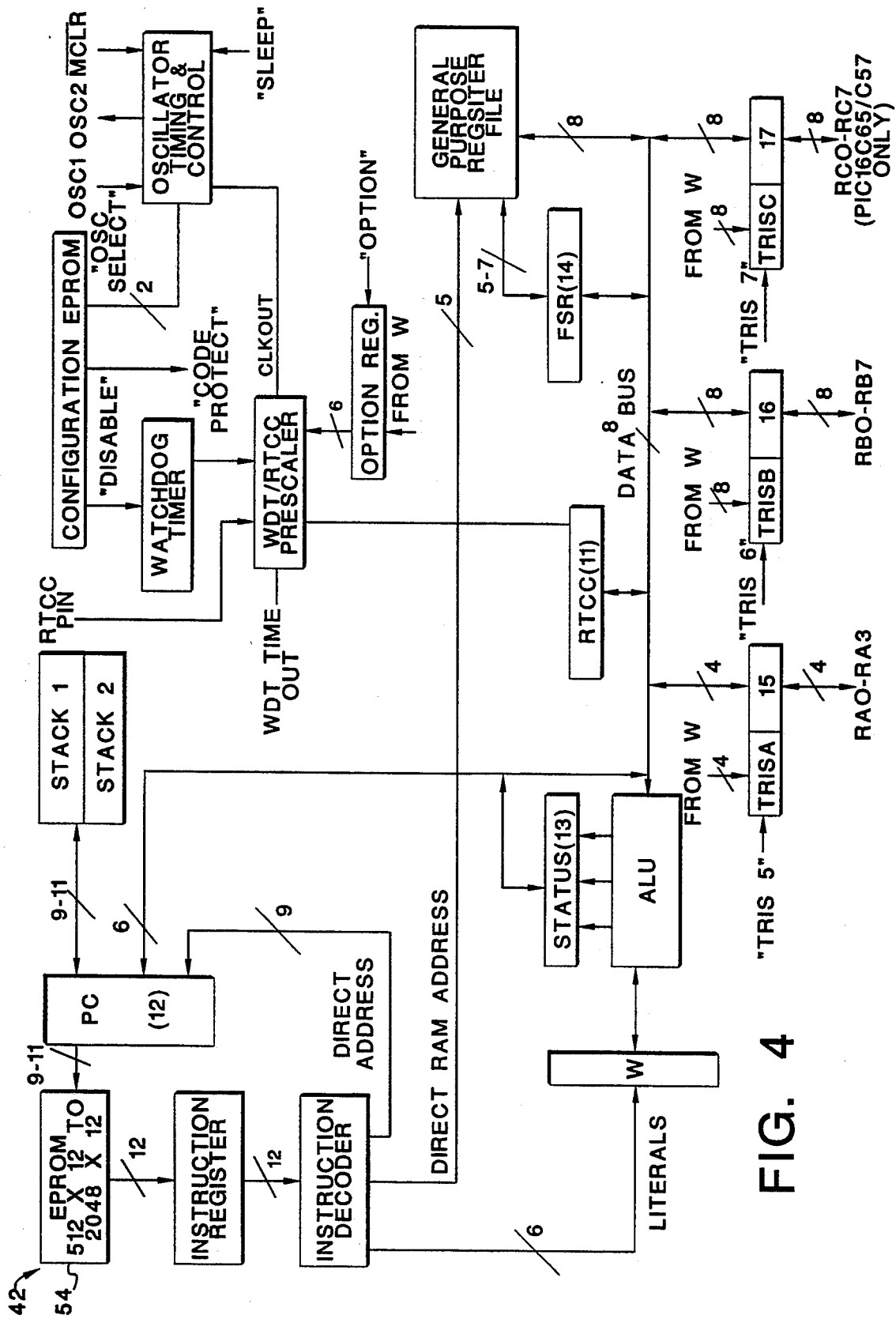
FIG. 4 shows a block diagram of a preferred microcontroller used by the circuit of FIG. 3.

A block diagram of the PIC16C5x series of EPROM-based 8-bit CMOS microcontrollers is shown in FIG. 4. The primary purpose for including FIG. 4 herein is to illustrate that the microcontroller 42 used as apart of the invention includes an EPROM memory 54 wherein a set of instructions, or an operating program, may be stored. The other elements and parts of the microcontroller 42 shown in FIG. 4 are believed to be self-explanatory to a person of skill in the art when considered in light of the published literature, available from Microchip Technology, Inc., relating to the use of the PIC16C5x series of microcontroller chips. Hence, no further explanation of FIG. 4 will be presented herein.

In comparing the PIC16C5x series of microcontrollers with other standard microprocessors used in the industry, such as a Intel 8051 family, and the Motorola 68HC05 family, it is noted that both the Intel and Motorola devices have many more instructions available, However, all of the instructions that do anything substantial take anywhere from 3 to 5 cycles, and each cycle at best takes from one-half to one microsecond. In contrast, the PIC16C5x series of EPROM-based 8-bit CMOS microcontrollers has a cycle time as fast as 200 nanoseconds for a complete instruction. Thus, the PIC16C5x is able to do a complete instruction in 200 nanoseconds, while the others may take 2500 nanoseconds (2.5 $\mu$S). Hence, with this type of speed available, the carrier frequency used by the present invention may be generated in software, thus eliminating the need for a separate hardware circuits to perform the functions of oscillator 22, crystal 21 and divider 23, as shown in FIG. 2.

Figure 5:
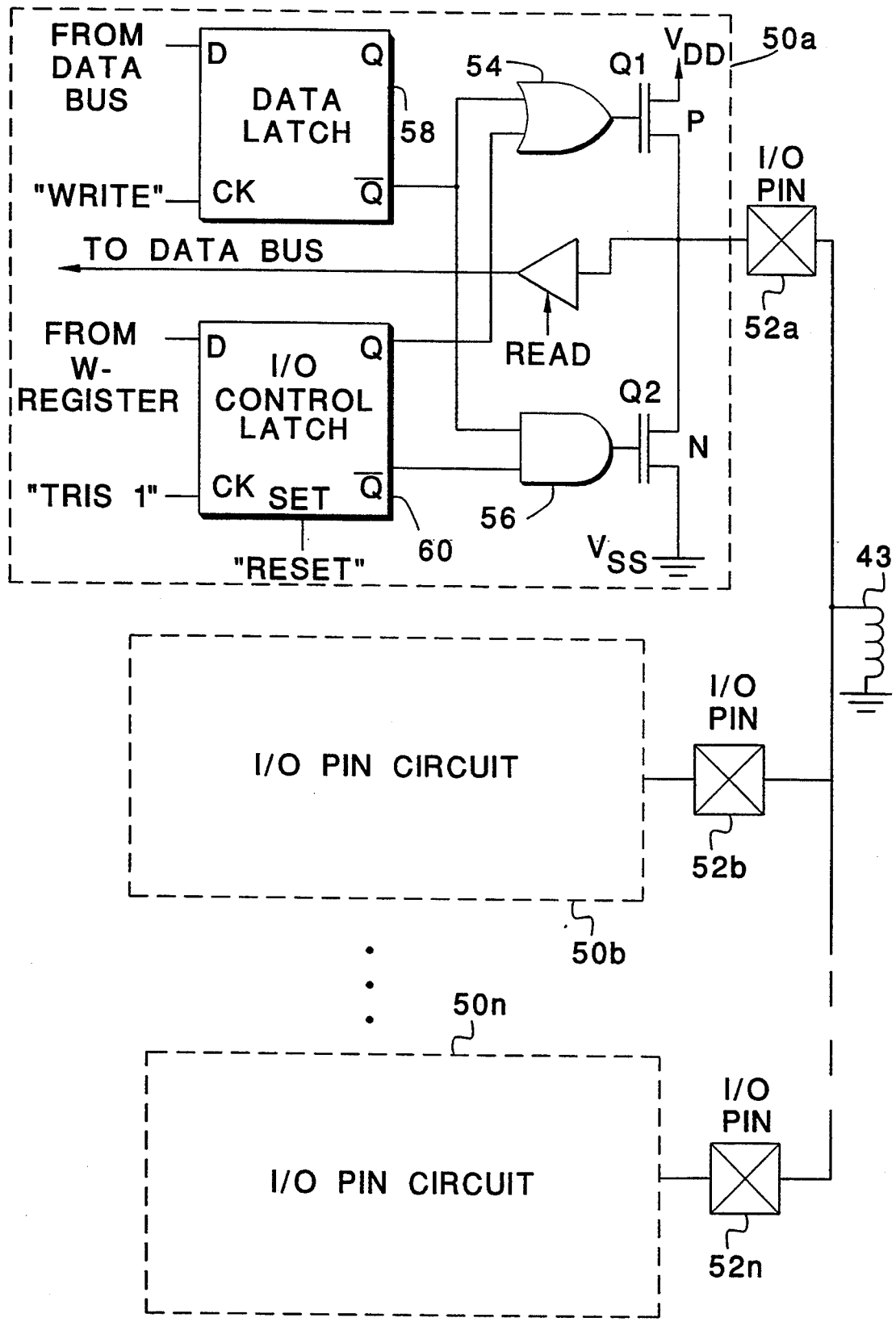
FIG. 5 shows how a plurality of the I/O pins of the microcontroller of FIG. 4 are connected in parallel to drive an antenna coil used by the identification device, thereby eliminating the need for a coil driver circuit.

A notable simplification and unique design associated with the identifier 40 involves wiring numerous outputs (I/O pins) of the microprocessor 42 in parallel and connecting such parallel outputs directly to the coil 43. Such parallel wiring is further illustrated in FIG. 5, where there is shown a representation of the typical input/output (I/O) circuit 50a associated with a given I/O pin 52a of the microcontroller 40. As seen in FIG. 5, a plurality of I/O circuits 50a, 50b, . . . 50n each include an I/O pin 52a, 52b, . . . 52n, respectively, to which an output driver, comprising CMOS transistors Q1 and Q2, is connected. Each transistor, in turn, is controlled through logic gates 54 or 56 by either a data latch circuit 58, or an I/O control latch circuit 60. In accordance with the present invention, a plurality of the I/O pins 52a, 50b, . . . 52n are wired in parallel and connected directly to the antenna coil 43, thereby eliminating the need for separate circuits as a driver circuit 24 or a filter circuit 25 (FIG. 2). In the preferred embodiment, four I/O pins of the microcontroller 42 are wired together in parallel in this manner. Such parallel connection of the I/O pins surprisingly provides the equivalent of a relatively low impedance driver that still has a high enough output impedance to allow a certain amount of filtering. Further, this unique design also allows the number of turns in the antenna coil 43 to be increased, thus requiring less power to drive it and creating a better receiving antenna 43 for the signal returning from the transponder 44. The antenna coil 43 may comprise 150 to 180 turns, e.g., 165 turns, of No. 30 gauge wire wound in a coil having a diameter of 4 to 6 cm, e.g., about 5 cm (2 inches).

Significantly, using a parallel connection of the I/O pins of the microcontroller 42 in the manner shown in FIG. 5 is not a purpose for which the I/O pins were designed. In the first place, the microcontroller 42 is a digital device, meaning that its outputs are intended to be digital signals, either low or high. Hence, a carrier signal voltage wave form appearing at one of the I/O pins 52, assuming a carrier frequency of $f_0$, would have the form of a square wave having frequency $f_0$. Applying a square wave driver signal to a coil is not desirable because many harmonics are created that represent inefficient use of the available power, not to mention problems that might be created by transmission of the harmonics. For that reason, prior "reader" units have always used some sort of power filter circuit to remove such harmonics. In the second place, the I/O circuits 50 of the microcontroller 42 are CMOS circuits and are not designed as high power output ports for driving an inductive load. However, by using a plurality of the CMOS I/O circuits in parallel, as shown in FIG. 5, sufficient drive current is obtained for driving the coil 43, and the inductance of the coil 43 serves to filter out the undesirable harmonics. Hence, a significant savings in circuit complexity is realized without a noticeable decrease in performance.

The received signal from the transponder 44 (signal 15 in FIG. 1) is recovered from the power carrier signal (electromagnetic energy) transmitted by the antenna coil 43 using a peak detector circuit 45. Such peak detector circuit 45 extracts the returned signal 15 from the power carrier signal 12 by removing most of the carrier energy, leaving some carrier energy, but mostly energy of the received signal. This is because the combined signal present at the antenna coil 43 comprises the combination of the power carrier signal 12 and the received signal 15, which received signal 15 is of a much lower frequency than the power carrier signal 12. Hence, when these two signals are superimposed at the coil 43, it appears as though the faster frequency power carrier signal 12 is AM modulated by the much-lower frequency returned signal 15. Thus, the peak detector circuit 45 effectively functions as an AM demodulator circuit, and extracts the lower-frequency returned signal 15 from the power carrier signal 12. It is noted, however, that such "extraction" or demodulation does not remove any additional modulation that may be present on the returned signal, which modulation may take numerous forms (e.g., AM, PSK, or FSK), and is used to encode the returned signal with the unique identification data that identifies the transponder.

It is noted that other "extraction means", other than a diode peak detection circuit 45, could be used by the invention to extract the returned signal 15 from the power signal 12 at the antenna coil. The particular type of extraction means used depends upon the characteristics of the returned signal 15.

The output of the diode peak detector 45 is fed to a multi-stage band pass amplifier 46 where most of the remaining power associated with the power carrier signal is filtered out, and the signal is amplified. The output of this multi-stage band pass amplifier 46 is thus a raw signal that contains either AM, FSK or PSK data that needs to be detected (demodulated). Such detection or demodulation, in accordance with the present invention, is performed within the microcontroller 42 under control of an operating program or routine. Such operating program or software routine analyzes the signal received from the band pass amplifier 46, and either measures its width for FSK, its amplitude for AM, or tests for phase shifts if PSK. Advantageously, by performing this function using the speed of the microcontroller 42, the needed demodulation can be performed without any additional hardware components.

The microcontroller 42 thus processes the signal received from the multi-stage band pass amplifier 46 in a accordance with a prescribed routine. Such processing includes at least demodulation, and may also typically include decoding the demodulated data to identify the particular transponder unit from which the data originated. The processing may also include converting the recovered data to an ASCII bit stream, as is normally performed by the UART 32 (FIG. 2).

The output data stream of the microcontroller 42, for some applications, may also need to be level shifted in an I/O interface circuit 47 to comply with whatever standard protocol is being used; such as, but not limited to, RS-232, RS-485, Weigand wire 48 etc. Thus, an I/O interface circuit 47 is used which may be of conventional design, and may be realized using commercially available I/O interface devices, such as the MAX 220--MAX249 Multi-Channel RS-232 Drivers/Receivers available from MAXIM.

An important feature of the present invention is the low cost of manufacture and ease of customizing the operation of the identifier 40 for different applications. By using a microcontroller 42 as the main element in the identifier 40, for example, and by making minor changes in software used to control the microcontroller 42, the identifier 40 can be configured to read Amplitude Modulation (AM), frequency Shift Keyed (FSK) or Phase Shift Keyed (PSK) modulation. Similarly, by making minor changes to the band pass amplifier circuit 46, a variety of manufacturer's products can be read due to the different return frequencies used. Software changes or modifications can also accommodate various data rates and formats.

Another important feature of the invention is the ability of the identifier 40 to be packaged in a very small space. Thus, the identifier 40 can be used for hand held portable readers or small modules mounted on machinery or walls or carried by animals or people.

One application of the invention, for example, is an automobile security system. Such a system is diagrammatically shown in FIG. 6. The system includes an electronic identifier 40, as described above in FIG. 3 (and as shown in further detail in FIG. 7), having an antenna coil 43. The identifier 40 is mounted within the automobile in a convenient, but usually hidden, location. In particular, the identifier device 40 is mounted so that the antenna coil 43 is in a location known to the owner of the automobile, but not otherwise discernable to anyone else. The owner carries with him a small portable, passive, transponder unit 44. Such unit may be sufficiently small to be carried on a key chain 45 and have the outward appearance of an identification tag. The identifier unit 40 is powered from the battery 49 of the automobile. A relay switch 58 replaces the I/O interface 47 shown in FIG. 3, and forms part of the identifier device 40. Alternatively, the relay switch 58 may be external to the identifier 40 and be controlled by the output of the I/O device 47. The relay switch 58 selectively connects the ignition system 60 of the automobile to the battery 49.

In operation, the owner of the vehicle enters the automobile and places the transponder unit 44 in close proximity, e.g., within 2-10 cm, of the location where the antenna coil 43 is located. The identifier 40 powers the transponder, enabling the transponder to send its identification signal 15 back to the antenna 43. The identification device then detects, extracts, demodulates and decodes the identification signal to see if it matches identification data previously stored therein. If so, then it audibly "beeps" two times, thereby signaling the owner that a correct identification has been made. Once a correct identification has been made, the relay switch 58 is closed for a prescribed time window, e.g., 8 seconds. During this prescribed time window, the ignition system of the automobile can function, i.e., the owner can start the engine and operate the automobile. Once the engine is started, then the relay switch is bypassed, and is no longer needed by the ignition system until such time as the engine is turned off for a prescribed time period.

Figure 6:
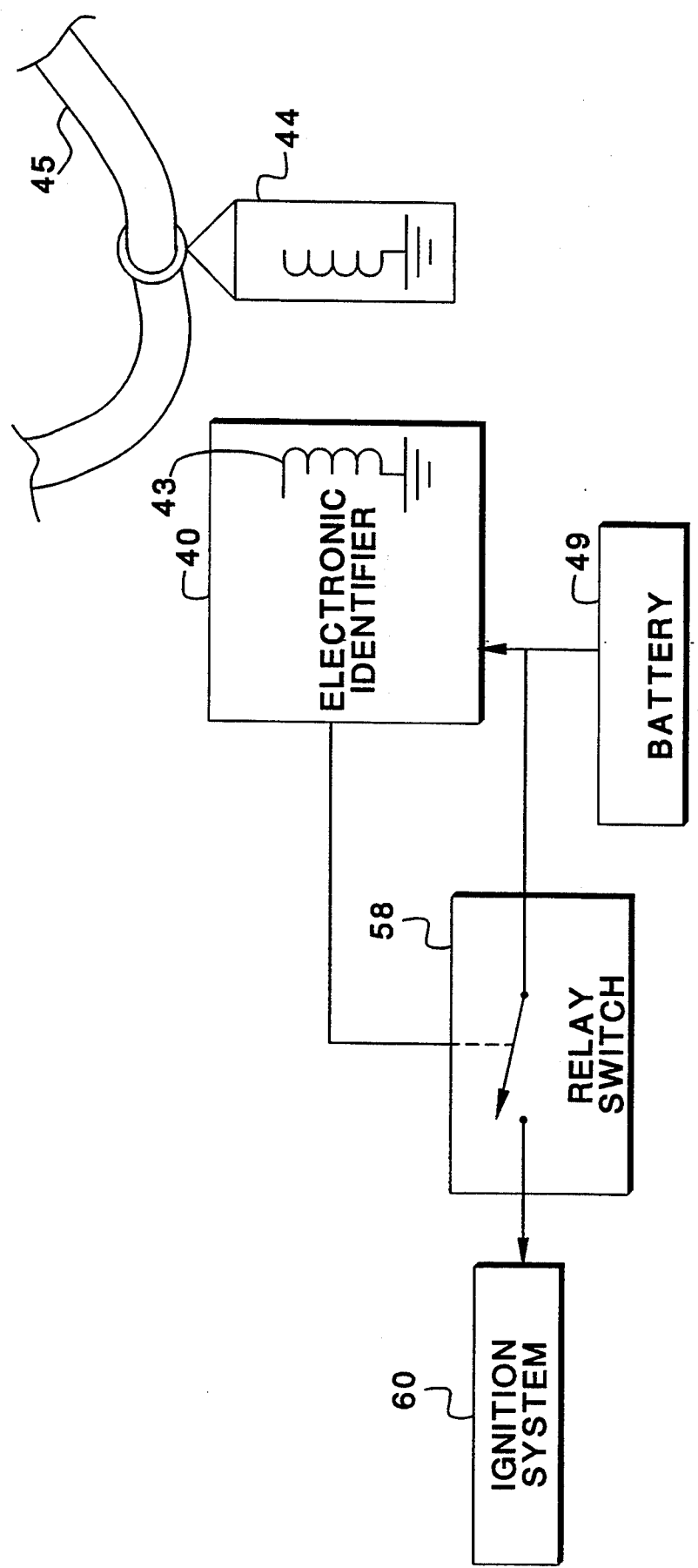
FIG. 6 is a block diagram illustrating the use of the identifier device of the invention in an automobile security system.
Figure 7:
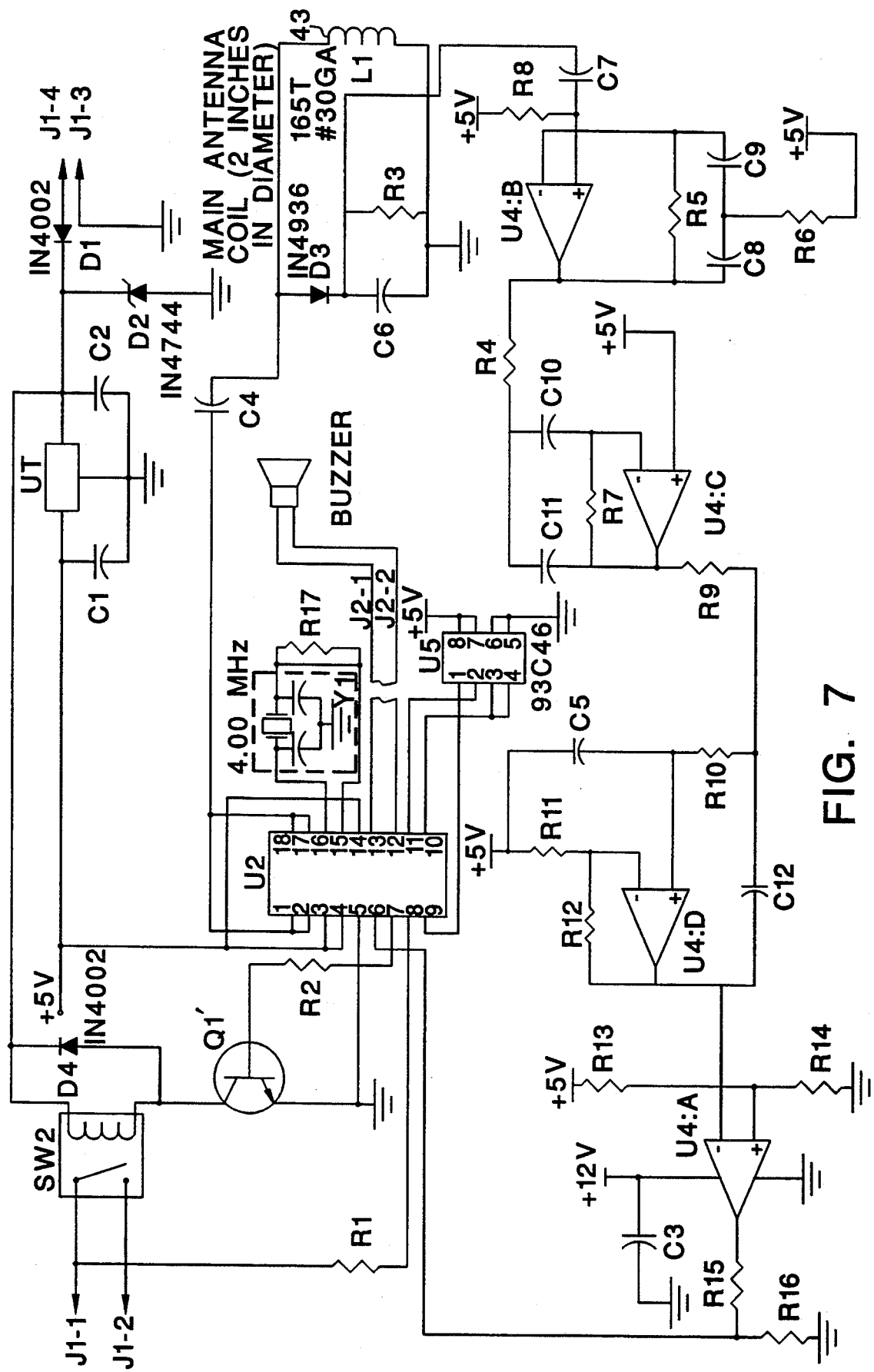
FIG. 7 is a schematic diagram of the identifier device of the present invention as used in the automobile security system of FIG. 6.

A schematic diagram of the identification device 40 used with the security system of FIG. 6 is shown in FIG. 7. Such schematic diagram is self-explanatory and should be readily understood to those of skill in the art. Basically, the integrated circuit U2 is the microcontroller 42, and is realized using a PIC16C54XT microcontroller chip, as described previously. The crystal Y1 comprises the crystal 41 (FIG. 3). The multi-stage band pass amplifier 46 comprises a four stage band pass amplifier made using the operational amplifiers U4A-U4D, and associated discrete components. The operational amplifiers may be packaged in a commercially available single quad op-amp integrated circuit, TL084. The I/O interface circuit 47 (FIG. 3) is made from a 2N2222 transistor, Q1', used as a switch to control the coil of a relay switch SW2, which relay switch SW2 functions as the relay switch 58 (FIG. 6). The diode peak detector 45 (FIG. 3) is realized using a single diode D3, and a capacitor C6 and resistor R3. Advantageously, including the microcontroller chip 42 (U2), and the quad op-amp chip (U4), the entire identifier device 40 may be realized using just two integrated circuit chips (three if an RS-232 chip is used in place of the relay switch SW2) and about 17 resistors, 12 capacitors, one inductor (the coil 43), one crystal, four diodes and one transistor, or a total of about 36 discrete components. Such components can readily be connected in circuit relationship as shown in FIG. 7 and fit on a circuit board having dimensions of only about 3.6 by 1.85 inches (about 9 by 4.7 cm). Such compactness has not heretofore been possible in an identifier or reader device that performs all of the functions that the present invention performs.

Figure 8:
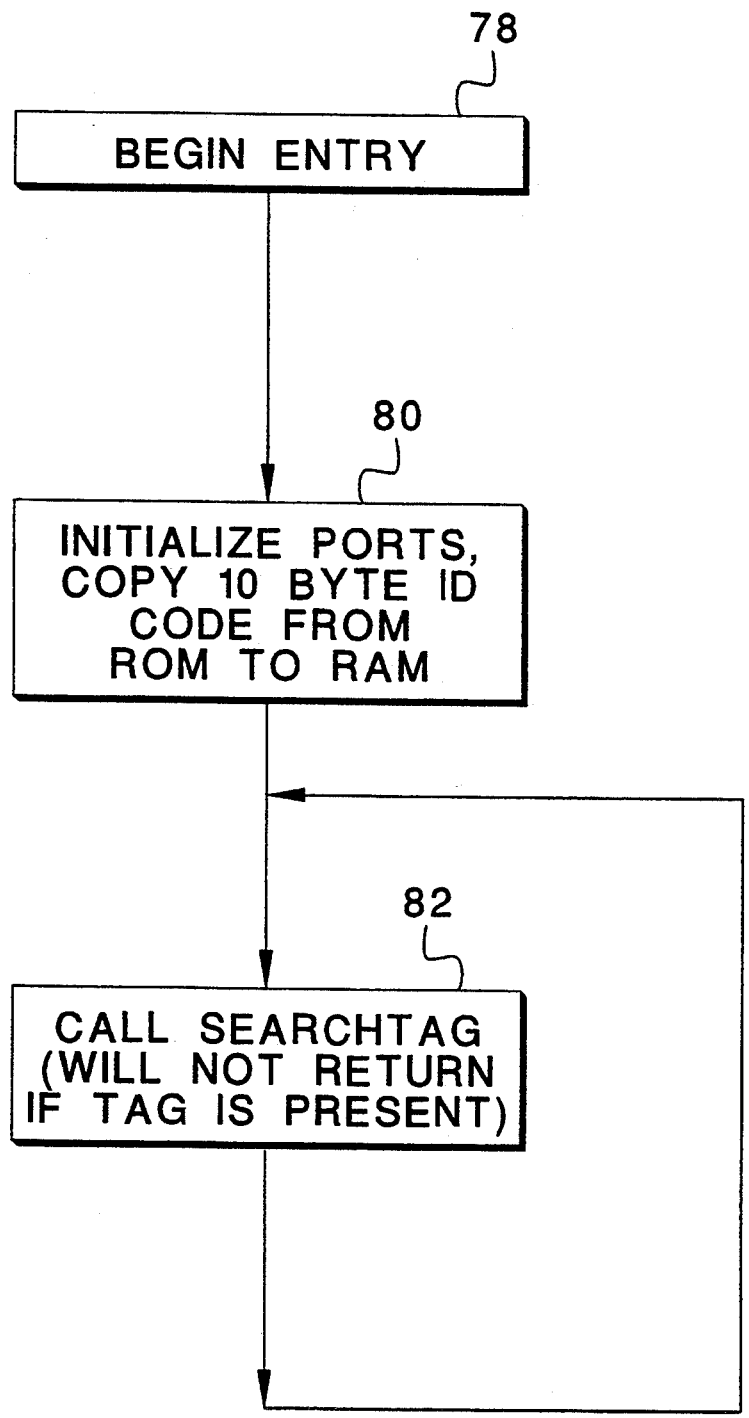
FIGS. 8–11 are flow charts that illustrate the control program(s) used within the microcontroller of FIG. 4 when the identifier device is used within an automobile security system.
Figure 9:
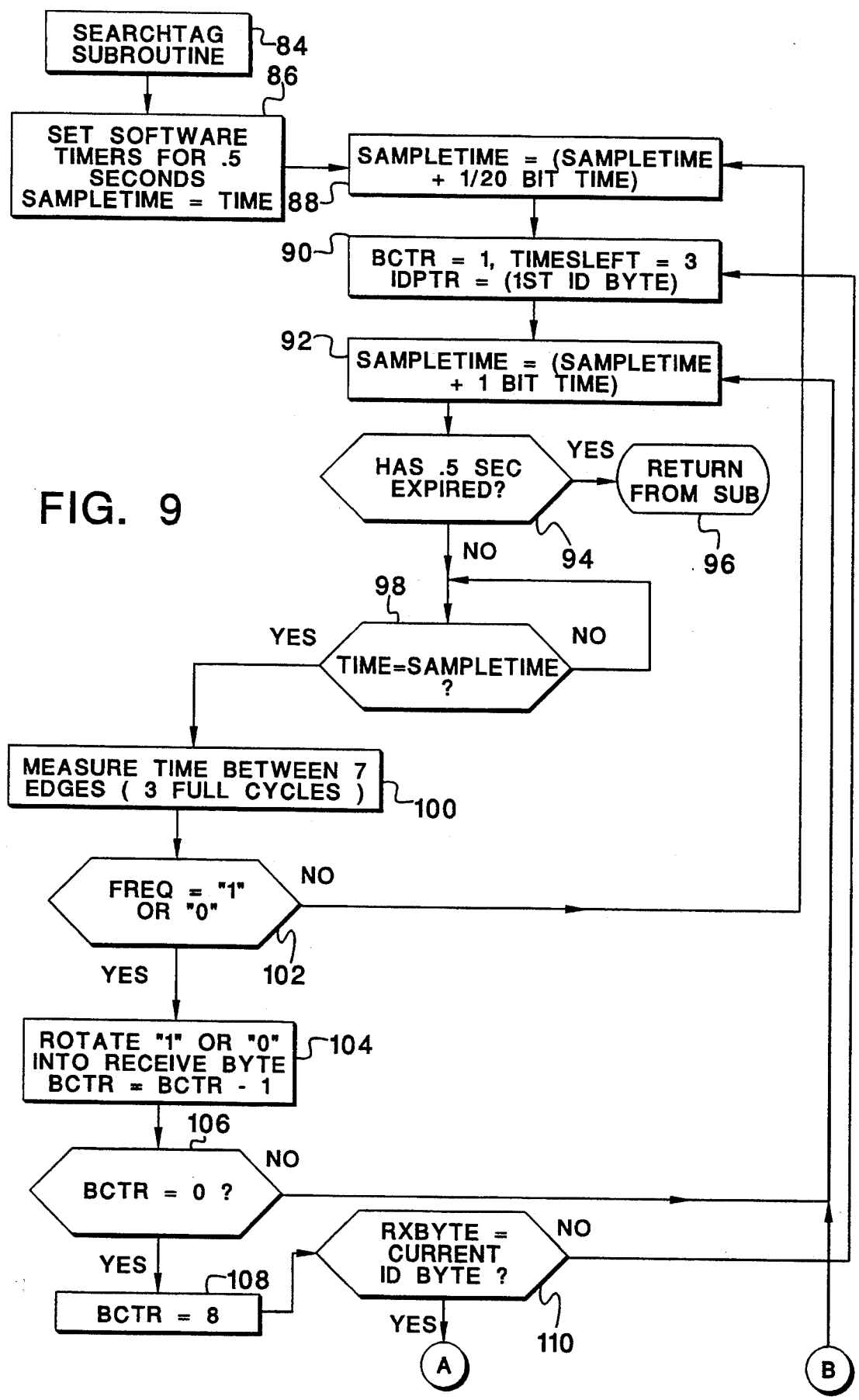
Figure 10:
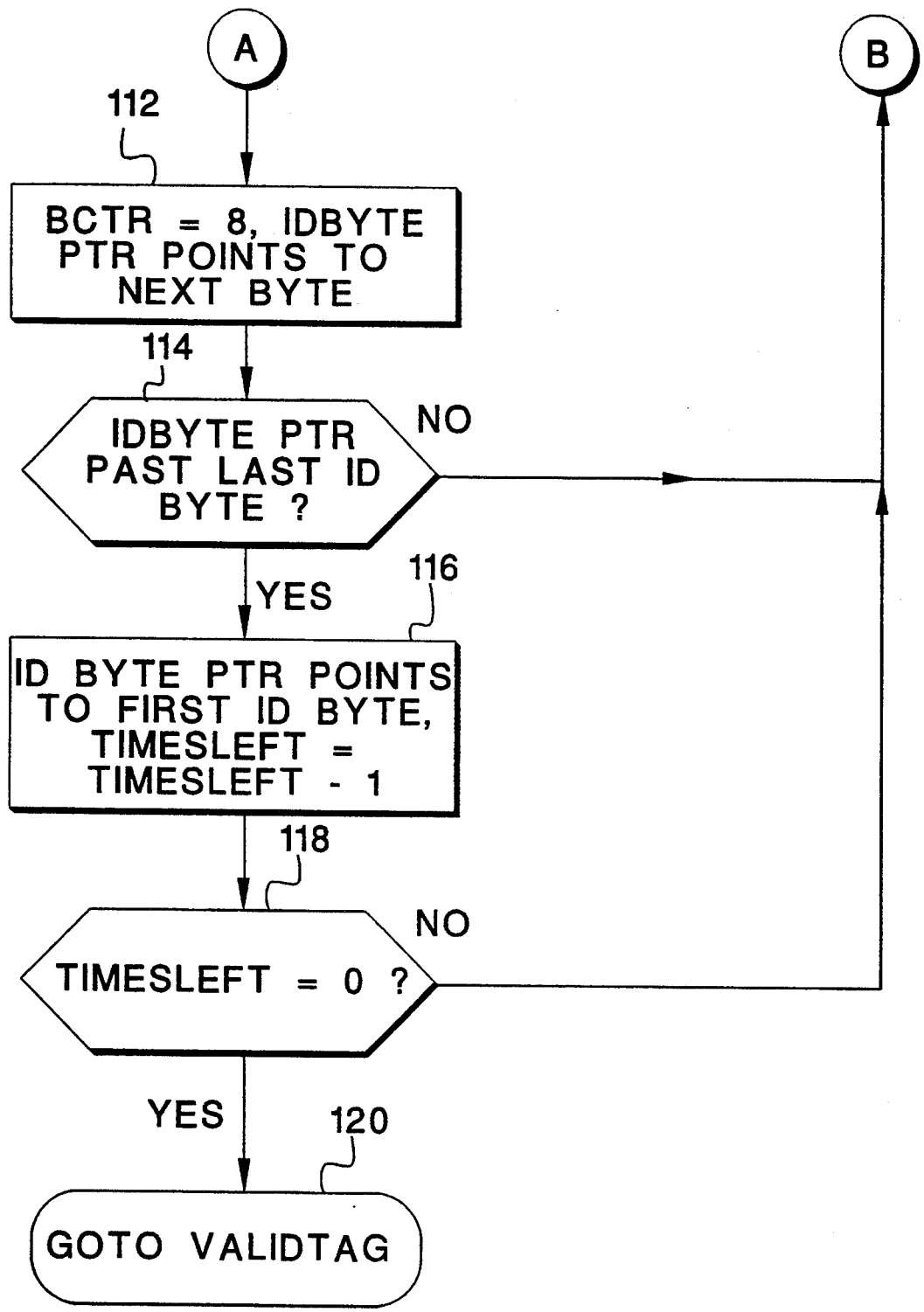
Figure 11:
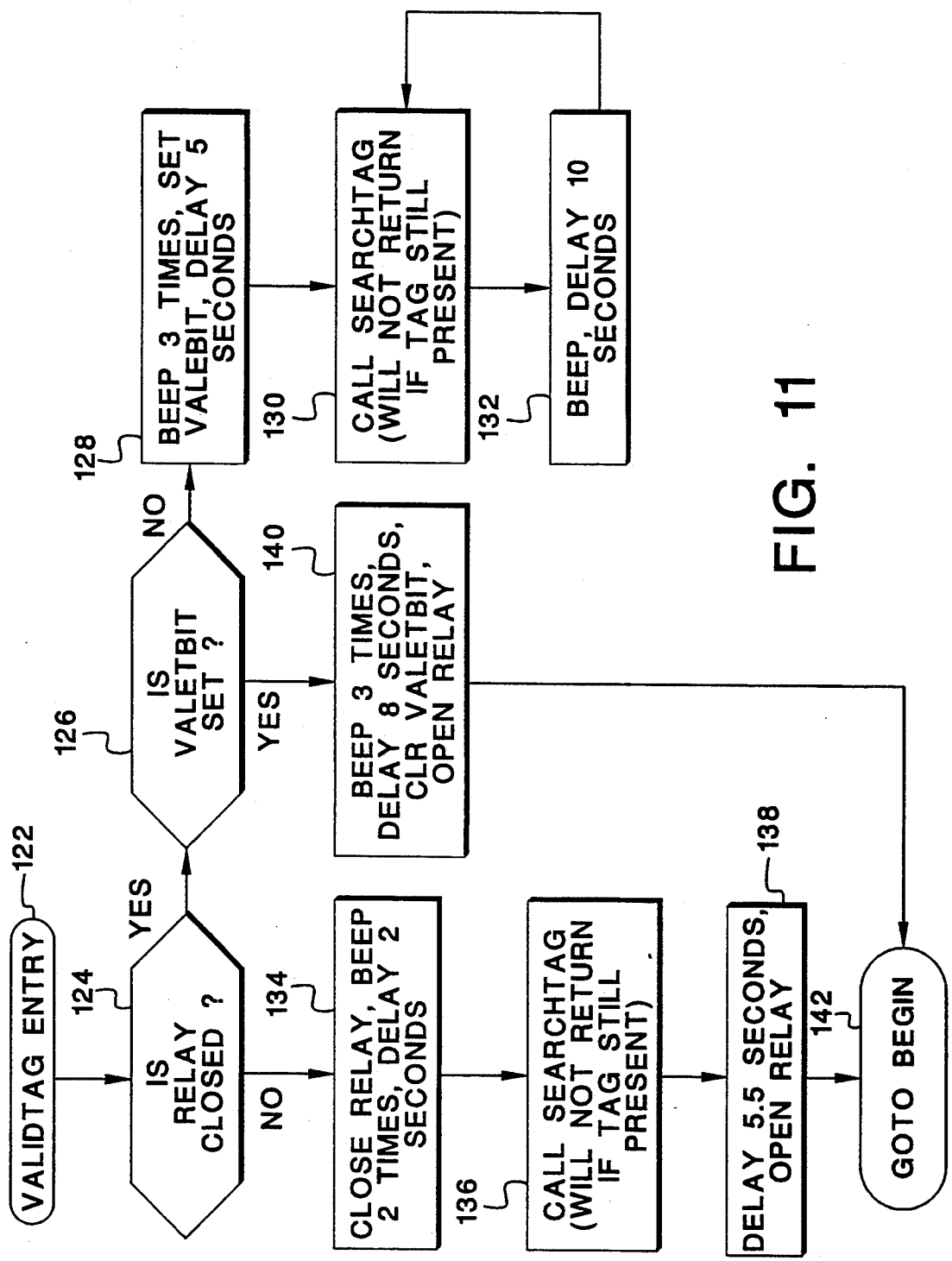

Referring next to FIGS. 8, 9, 10 and 11, a series of flow charts are shown that detail the control program(s) that are stored in the memory 54 of the microcontroller chip 42 when used to carry out an auto security application of the invention. Each flow chart includes a series of main steps that are depicted in "boxes" or "blocks," with a directional line or lines interconnecting each box or block to indicate how the "flow" of the operation proceeds. It is also noted that FIGS. 9 and 10 show the same flow chart, with a portion thereof being included in FIG. 9, and another portion thereof being shown in FIG. 10. It is submitted that a person of skill in the art can readily program a microcontroller, such as the microcontroller 42 (FIG. 3) described above, with appropriate code and commands to carry out the operation depicted in the flow charts of FIGS. 8-11.

It is to be emphasized that the automobile security application depicted in FIGS. 6-11 is only exemplary of one of the many and varied applications with which the present invention may be used. For example, the identifier of the present invention may be used to open doors or enable certain services or benefits only for certain "identified" people, track animals, feed animals, track inventory, identify objects (particularly movable objects), and the like.

The flow charts of FIGS. 8-11 are self explanatory to those of skill in the art. Nonetheless, the following supplementary comments are provided to provide an overview of the control program's operation. The basic operating program for the identifier device 40 (and more particularly for the microcontroller 42 used within the identifier device 40 ) is shown in FIG. 8. Once the operation begins (block 78), such program simply initializes all of the ports, and copies a 10 byte ID code from ROM to RAM (block 80). Such transfer is done simply to facilitate accessing the 10 byte ID code later on. Once the initialization has been completed, a subroutine entitled "Searchtag" is called (block 82). If the transponder tag is not present (i.e., not within range of the identifier 40), then the subroutine Searchtag continues to be called, until such time as the transponder tag is present. The range of the identifier device is typically 2-10 cm. When within range, the transponder is powered by the output power signal generated by the identifier device.

If a transponder tag is present, then the Searchtag routine is invoked (block 84 of FIG. 9). Software timers are set to an appropriate value, e.g., 0.5 second, and a "sampletime" variable is defined and set equal to a "time" parameter (block 86). Next, the received signal from the transponder, after being appropriately filtered in the multi-stage band pass amplifier, is demodulated. Such demodulation includes setting an appropriate sample time, and testing the signal at successive increments of the sample time (blocks 88-98), including performing appropriate time shifts, in order to determine if the 8 bits of each received byte of the received signal match corresponding bits of each byte of the ID code that was stored in RAM during initialization. If no match is obtained within the time specified (e.g., 0.5 seconds), then the subroutine ends (block 976). If all eight bits of a given byte match, then a byte pointer moves to the next byte, and the process repeats, looking for a match between the bits of all 10 bytes (blocks 112-120 of FIG. 10). If all 10 bytes match the ID code byte that was initially loaded in RAM, the a determination is made that a valid tag (transponder) is present (block 120). In such instance, a subroutine called "ValidTag" is then invoked.

When the subroutine ValidTag is invoked (block 122 of FIG. 11), a first determination is made as to whether the relay switch 58 (FIG. 6) is closed (block 124 of FIG.

11). If so, then another determination is made as to whether a valet bit is set (block 126). If the valet bit is not set, then the system beeps three times, the valet bit is set, and a delay of 5 seconds occurs (block 128). The Searchtag subroutine (FIGS. 9 and 10) is then again invoked (block 130). If the transponder tag is not present, then a beep is issued, and there is a 10 second delay (block 132). If a transponder tag is present, then the Searchtag routine is again traversed, and if a valid transponder tag is identified, then the ValidTag routine is again commenced (block 122). However, this time through the ValidTag routine, the valet bit is set, having been set previously, so when the determination is made (at block 126) that the valet bit is set, three beeps are generated, an 8 second delay occurs, the valet bit is reset and the switch relay is opened (block 140).

If the switch relay is not closed after the ValidTag routine is entered (as determined at block 124), then the switch relay is closed, two beeps are generated, and a 2 second delay occurs (block 134). The two beeps signal the owner that he should remove the transponder away from the identifier device. The Searchtag routine is then called (which takes about 0.5 seconds to complete if no encoder tag is present), and then there is another delay of 5.5 seconds. The owner of the car thus has a total of 8 seconds from the time two beeps are generated to start the car. After eight seconds, the relay switch is opened (block 138), and the process must be repeated if the relay switch is to be closed.

As described above, it is thus seen that the present invention provides a versatile, low cost, compact, identifier device that allows a transponder unit to be identified.

While the invention herein disclosed has been described by means of specific embodiments and applications thereof, numerous modifications and variations could be made thereto by those skilled in the art without departing from the scope of the invention set forth in the claims.

What is claimed is:

1. Electronic identifier apparatus comprising:
    an antenna coil;
    a single chip microcontroller, said single chip microcontroller including:
        a memory circuit wherein a control program is stored, and
        a multiplicity of I/O pins through which data signals are transferred into and out of said single chip microcontroller, each I/O pin being connected to a respective I/O circuit included within said single chip microcontroller, a plurality of said I/O pins being connected in parallel to said antenna coil;
    extraction means connected to said antenna coil for extracting an ID carrier signal from whatever signals may be present at said antenna coil;
    a band pass amplifier connected to said extraction means, said band pass amplifier being configured to pass the ID carrier signal received through said antenna coil and extraction means, any ID carrier signal that passes through said band pass amplifier being connected to said single chip microcontroller;
    said single chip microcontroller being configured by said control program to (a) generate a power output signal that is applied to said antenna coil through said plurality of parallel-connected I/O pins, (b) decode any ID carrier signal that is received from said band pass amplifier, and (c) produce at least one control signal responsive to the receipt and decoding of a particular ID carrier signal; and
    an interface circuit connected to said single chip microcontroller circuit through which said control signal operates to perform a specified function.

2. The identification apparatus as set forth in claim 1 wherein said interface circuit includes a relay switch.

3. The identification apparatus as set forth in claim 1 wherein said band pass amplifier comprises a multistage band pass amplifier utilizing an operational amplifier within each stage.

4. The identification apparatus as set forth in claim 3 wherein said multi-stage band pass amplifier comprises four stages, each stage including one of the operational amplifiers of a quad operational amplifier integrated circuit.

5. The identification apparatus as set forth in claim 1 wherein said single chip microcontroller comprises an EPROM-based 8-bit CMOS Microcontroller of the PIC16C5x series of EPROM-based 8-bit CMOS Microcontrollers.

6. The identification apparatus as set forth in claim 5 wherein said antenna coil comprises 150–180 turns of number 30 gauge wire wound in a coil having an approximate diameter of 4 to 6 cm.

7. The identification apparatus as set forth in claim 6 wherein the number of I/O pins of said single chip microcontroller that are connected in parallel to said antenna coil comprises at least four.

8. The identification apparatus as set forth in claim 7 wherein said peak detector circuit includes a diode and a capacitor that perform an amplitude demodulation function.

9. The identification apparatus as set forth in claim 1 wherein said interface circuit includes a standard RS-232 interface circuit through which digital data signals may pass in serial fashion.

10. The identification apparatus as set forth in claim 9 wherein all of the elements of said identification apparatus may be mounted on a circuit board having dimensions of about 9 cm by 4.7 cm.

11. Electronic identifier apparatus constituting:
    an antenna coil;
    a single chip microcontroller, said single chip microcontroller including
        a memory circuit wherein a control program is stored, and
        a multiplicity of I/O pins through which data signals are transferred into and out of said single chip microcontroller, each I/O pin being connected to a respective I/O circuit included within said single chip microcontroller, a plurality of said I/O pins being connected in parallel to said antenna coil;
    a peak detector circuit connected to said antenna coil;
    a multi-stage band pass amplifier connected to said peak detector circuit, said band pass amplifier being configured to pass an ID carrier signal received through said antenna coil and peak detector circuit, any ID carrier signal that passes through said pass amplifier being connected to a specified one of the I/O pins of said single chip microcontroller;
    an interface circuit connected to said single chip microcontroller circuit through which a control signal generated by said single chip microcontroller circuit may perform a specified function; and means for connecting an external power source to said single chip microcontroller, interface circuit, and band pass amplifier, whereby operating power is provided to said identifier apparatus;

said single chip microcontroller being configured by said control program to at least: (a) generate a modulated output signal that is applied to said antenna coil through said plurality of parallel-connected I/O pins, (b) demodulate and decode any ID carrier signal that is received at the specified one of the I/O pins connected to said band pass amplifier, and (c) produce said control signal responsive to the receipt, demodulation and decoding of a particular ID carrier signal.

12. The identification apparatus as set forth in claim 11 wherein all of the elements of said identification apparatus are realized using two integrated circuits and no more than about 36 discrete components.

13. The identification apparatus as set forth in claim 12 wherein said single chip microcontroller comprises an EPROM-based 8-bit CMOS Microcontroller of the PIC16C5x series of EPROM-based 8-bit CMOS Microcontrollers.

14. The identification apparatus as set forth in claim 13 wherein said antenna coil comprises approximately 150-180 turns of number 30 gauge wire wound in a coil having an approximate diameter of 4 to 6 cm.

15. The identification apparatus as set forth in claim 13 wherein the number of I/O pins of said single chip microcontroller that are connected in parallel to said antenna coil comprises at least four.

16. A method of electronically identifying a transponder unit, said transponder unit having circuitry that transmits an assigned identification signal upon being powered from an external source, said method comprising the steps of:

(a) generating a square-wave carrier signal using a single chip microcontroller and outputting said carrier signal to a multiplicity of I/O pins of said single chip microcontroller;

(b) connecting a plurality of said multiplicity of I/O pins in parallel and connecting the resulting parallel connection directly to an antenna coil having an inductance, whereby said square-wave carrier signal is applied directly to said antenna coil from the I/O pins of said single chip microcontroller, and a current flows through said antenna coil that, because of said inductance, is filtered to be more or less sinusoidal;

(c) positioning said antenna coil within about 2 to 10 cm of said transponder unit so that power is induced in said transponder unit from said carrier signal, whereby said transponder unit transmits its assigned identification signal;

(d) sensing and demodulating any identification signals that may be transmitted by said transponder unit while said antenna coil remains within about 2 to 10 cm of said transponder unit; and (e) decoding the identification signal sensed and demodulated in step (d) to determine a particular transponder unit from which said identification signal was transmitted.

17. The method as set forth in claim 16 wherein step (e) further includes verifying if the identification signal sensed and demodulated in step (d) is the identification signal assigned to a particular transponder unit, and if so generating a control signal that controls a prescribed operation that is carried out once a proper identification has been verified.

* * * * *